United States Patent [19]

Shahan et al.

[11] 4,436,119
[45] Mar. 13, 1984

[54] THERMAL ACOUSTICAL PIPE INSULATION

[76] Inventors: James E. Shahan; Loren Pitts, both of 55 E. Jackson Blvd., Chicago, Ill. 60604

[21] Appl. No.: 422,462

[22] Filed: Sep. 24, 1982

[51] Int. Cl.³ .......................... F16L 3/08; F16L 59/12
[52] U.S. Cl. .................................. 138/149; 138/114; 181/207; 248/604
[58] Field of Search ............... 138/108, 113, 114, 149; 181/208, 207; 248/603, 604, 609

[56] References Cited

U.S. PATENT DOCUMENTS

| Re. 28,930 | 8/1976 | Johnson | 138/149 |
|---|---|---|---|
| 340,691 | 4/1886 | Aldrich | 138/149 |
| 2,263,919 | 11/1941 | Darragh | 181/207 |
| 2,707,493 | 5/1955 | Bonvillian et al. | 138/149 |
| 3,168,114 | 2/1965 | Martin | 138/114 |
| 3,595,275 | 7/1971 | Steans | 138/149 |
| 3,830,595 | 8/1974 | Carpenter et al. | 248/603 |
| 4,155,529 | 5/1979 | Maudlin | 248/604 |

FOREIGN PATENT DOCUMENTS

| 3001827 | 7/1981 | Fed. Rep. of Germany | 138/149 |
|---|---|---|---|
| 837584 | 2/1939 | France | 248/603 |
| 1060740 | 4/1954 | France | 138/149 |

Primary Examiner—John W. Shepperd

[57] ABSTRACT

A system for insulating and isolating a pipe, thermally and acoustically, from its outer metallic cover or lagging, with the system consisting of a pipe jacket providing an external cover or lagging, an inner body of insulation such as fiberglass or the like, a vibration absorption unit and a series of spacers yieldably separating the jacket from the pipe to be insulated.

4 Claims, 5 Drawing Figures

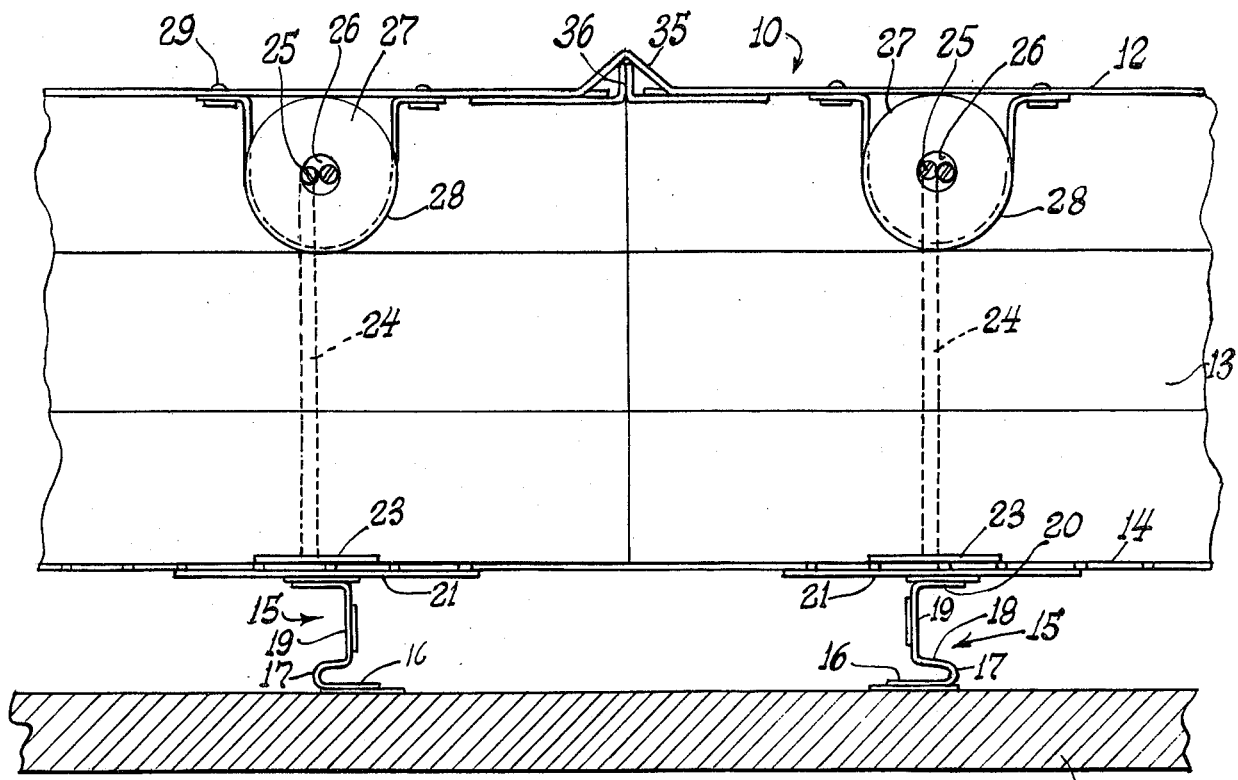
FIG. 2.
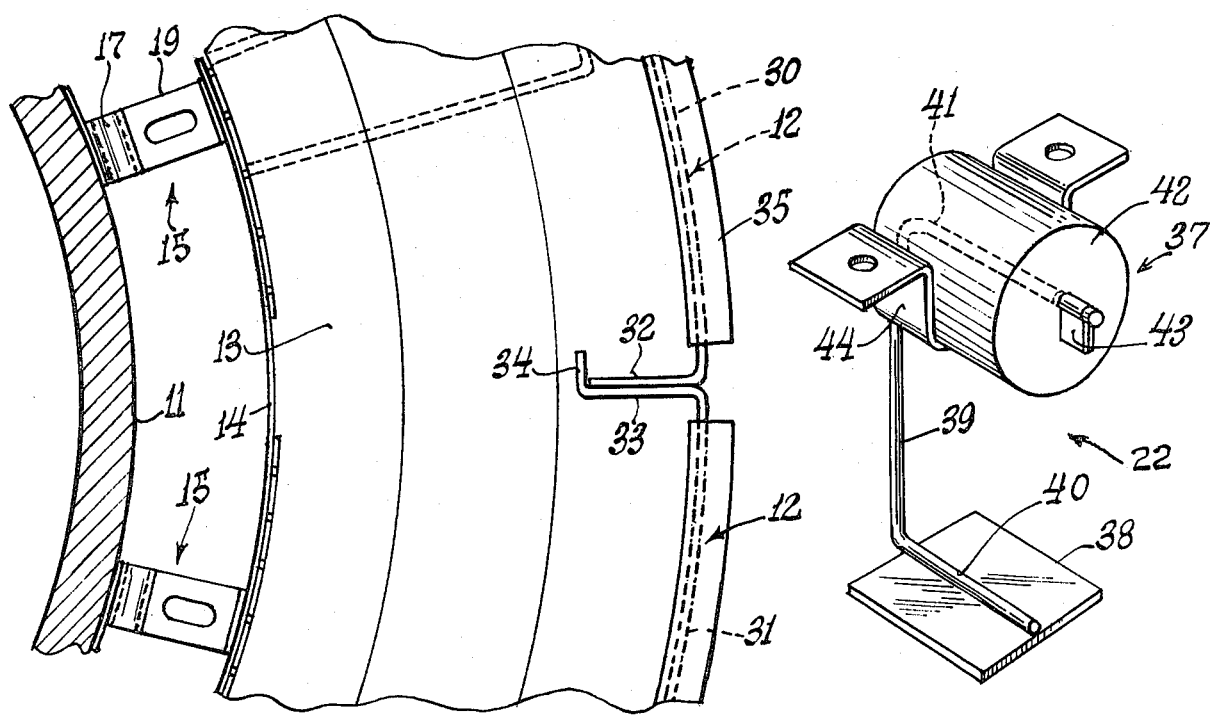
FIG. 3.
FIG. 5.

THERMAL ACOUSTICAL PIPE INSULATION

SUMMARY OF THE INVENTION

In the construction of nuclear power plants and the like there is a vast system of conduits through which highly heated and pressurized fluids flow. This requires a method of construction whereby such conduits are insulated and whereby the acoustical vibrations created therein by the flow of fluids therethrough is isolated. The present invention relates to a system for accomplishing these stated requirements.

The present invention, in addition to the temperature insulation, includes a standoff type of vibration damper that consists of a base plate adapted to be supported by the inner lining of the insulated material which inner lining may be constructed of expanded or perforated metal or wire cloth. The damper provides a leg type support for a cylindrically shaped isolator composed from rubber, silicone, neoprene, or gum. This isolator, by a band support, may be secured to the confronting inner surface of the outer cover or lagging.

The present invention provides a covering jacket for a fluid conduit which insulates against temperature transmissions from the conduit, and will also act to isolate vibrations of the same so as to acoustically insulate the conduit. The system by which this is accomplished is simple in construction, and economical in manufacture, and adapted to be readily applied to the structure requiring its presence.

Another important object of this invention is to provide a structure, the components of which cooperate to produce a self-supporting integral system. This is achieved by providing longitudinal as well as circumferential joint connections between the heavier structural elements of the system, primarily the outer cover or lagging.

BRIEF DESCRIPTION OF THE DRAWINGS

The invention will be best understood by reference to the accompanying drawing, which shows the preferred form of construction by which the objects of the invention are achieved, and, in which:

FIG. 2 is a fragmentary detailed side sectional view of the invention;

FIG. 3 is a fragmentary end detailed sectional view of the invention;

FIG. 5 is a modified form of vibration isolator for this invention.

GENERAL DESCRIPTION

Figure 1:
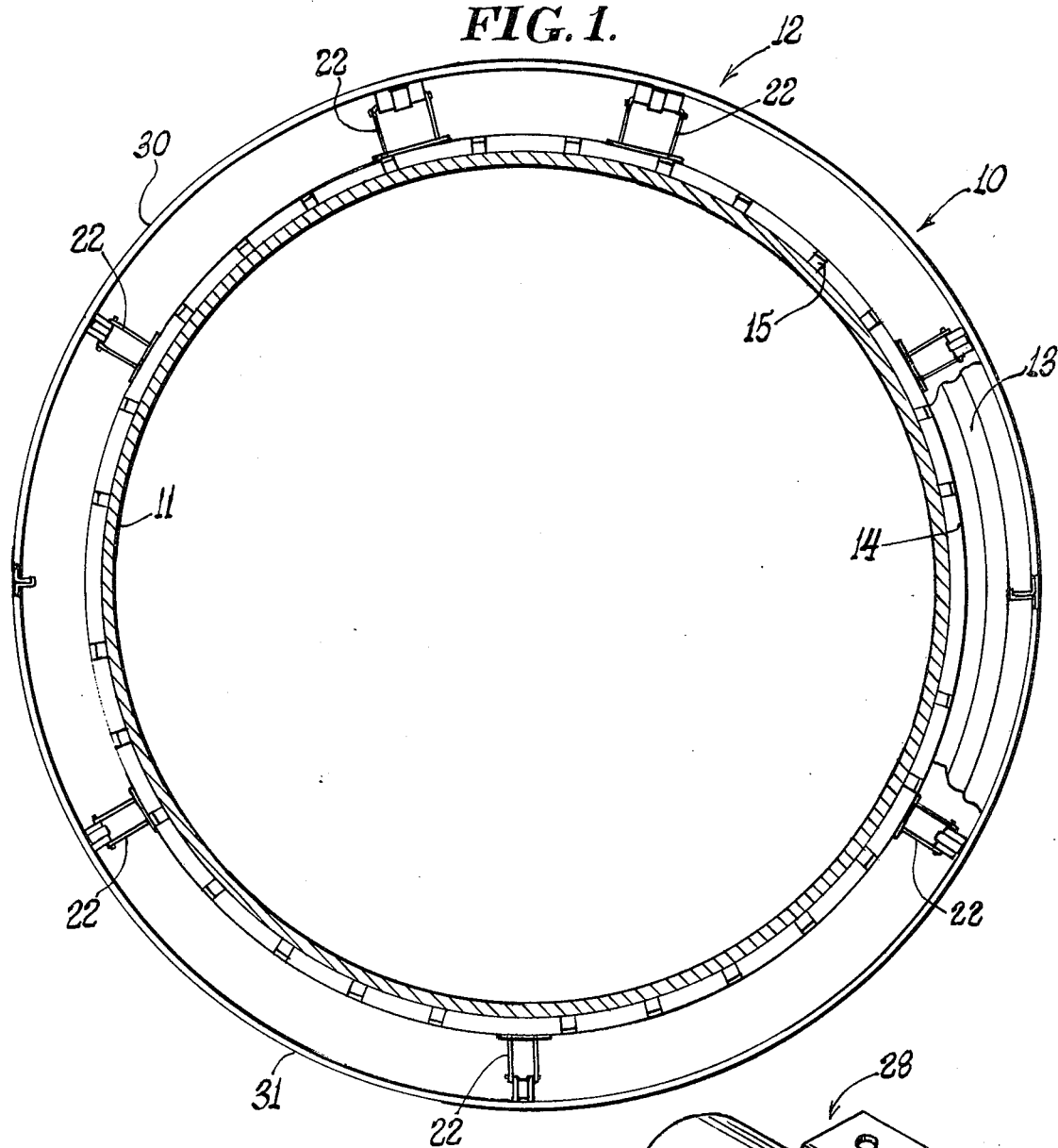
FIG. 1 is a cross sectional, detailed view of the assembled thermal and acoustical pipe insulating system.

As shown in FIG. 1, the system includes a jacket 10 that is adapted to embrace a pipe 11. As such, the jacket 10 consists of an outer covering or lagging 12 which may be of any configuration, such as corrugated and the like, and one which is constructed from metallic material, such as steel or aluminum.

To the inner face of the lagging 12 is applied layers of fibrous insulation 13. The exposed surface of the insulation 13 is covered by an inner lining 14 which may be wire cloth, or of a metallic expanded or perforated material.

There is periodically located about the circumference of the pipe 11, a series of isolation spacers 15.

As shown in FIG. 2, these isolation spacers 15 include a base 16, one end of which is curved, as at 17, so as to provide a short straight run 18 which extends in spaced parallel relation to the base 16. The run 18 terminates into a right angle limb 19, which in turn terminates into a right angularly disposed foot 20. The foot 20, by a series of reinforcing plates 21, is connected to the inner lining 14. By this arrangement, when changes or variations in the diameter of the conduit 11, due to heating and/or cooling, or any misalignment in the lagging 11 when the jackets are installed on the conduit 11, will be readily compensated for by a change in the degree of curvature of the curved end 17 of the spacer 15. These spacers 15 effectively separate and reduce physical contact between the conduit 11 and the jacket 10. This aids in the insulation of the conduit 11, as well as the dampening of any acoustical vibrations emitted therefrom.

To completely eliminate any acoustical vibrations from being transmitted from the piping 11 to the lagging 12, there is provided a series of isolators 22. These isolators 22 are of identical construction and will vary only in size. As illustrated in FIG. 2, a portion of the insulation material 13 is removed, adjacent the lagging 12, so as to provide a pocket for the isolator.

Figure 4:
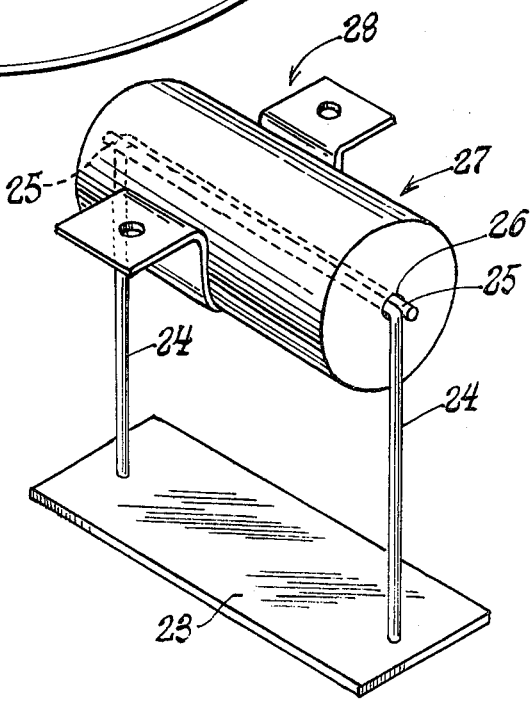
FIG. 4 is a perspective view of the vibration isolator, as employed in this invention.

As shown in FIG.4, the isolator 22 includes a base plate 23. Extending perpendicular to the base plate 23 is a pair of L-shaped supports 24. The arrangement of the supports 24 is such that the free legs 25 of each support 24 extend in coaxial opposite directions. Each of the legs 25 are independent of each other, and are adapted to be projected into the center bore 26 of a vibration dampener 27. As each independent leg 25 projects in an opposite direction through the center bore of the dampener 27, it is retained onto the isolator 22 between the supports 24. Being independent and disconnected, no vibrations will pass therebetween.

The dampener 27 is preferably cylindrical in cross section, and can be made from a rubber, silicone, neoprene, or gummed material. A U-shaped clamp 28 will embrace a segment of the circumference of the dampener 27, and in turn, be attached to the inner surface of the lagging 12 by means of screws or rivets 29. The diameter of the dampener 27 is such that it will engage the inner surface of the lagging 12 when the clamp 28 connects the same to the lagging 12.

By this construction the isolator 22, as it extends between the inner lining 14 and the lagging 12, will function to secure the insulation 13 upon the inner surface of the lagging 12, with a minimum physical contact between vibration transmitting members.

The lagging 12 of the jacket 10 is preferably constructed from two symmetrically shaped semicircular sections 30 and 31. As such, the longitudinally abutting edges of these sections are formed to provide a connection, such as that shown in FIG. 3. The longitudinal edge of section 30 is formed to provide a right angled leg 32, which projects inwardly of the insulated material 13. The confronting edge of the section 31 provides a like right angularly formed leg 33. However, the leg 33 terminates into a supporting foot 34, which extends beyond the end of the leg 32 of section 30. By this construction, the two longitudinal sections 30 and 31 of the jacket 10 will be prevented from compressing on each other, and will be prevented from lateral displacement by the foot 34. It being understood that the opposite longitudinal edges of the sections 30 and 31 are reversed in configuration so as to be schematically opposed to that shown in FIG. 3.

A series of jackets may be required to be placed upon the conduit 11, and in order to connect the jackets together in a longitudinal plane, a V-shaped connecting band 35 will engage and clamp together confronting flanges 36 attached to the confronting circumferential edges of the aligned jackets. This arrangement is clearly shown in FIG. 2.

A modified isolator 37 is shown in FIG. 5, and it includes a base 38, together with a U-shaped support 39. One arm of the U-shaped support 40 is fastened to the base 38, while the other arm 41 projects through the center bore of the cylindrical damper 42. A restraining clip 43 may be placed on the exposed end of the leg 41 to hold the damper 42 thereon. A U-shaped clamp 44 is utilized to attach the isolator to the inner surface of the lagging 12.

From the foregoing it is apparent that I have provided a temperature insulator and acoustical vibration dampener incorporated into a jacket that may be readily placed about a conduit. The system provides a spacing variation adjustment means between the jacket and the conduit which does not effect the thermal and acoustical insulation capacity of the jacket. Any vibrations emitted from the conduit 11 will be readily absorbed by the dampener 27 of the isolator 22. The dampener 27 constitutes the only connection between the outer lagging of the jacket and the inner restraining material for the insulating material. This arrangement is highly efficient in preventing thermal and acoustical emissions from being transferred from the conduit to the exterior lagging.

While we have illustrated and described the preferred form of construction for carrying our invention into effect, this is capable of variation and modification without departing from the spirit of the invention. We, therefore, do not wish to be limited to the precise details of construction as set forth, but desire to avail ourselves of such variations and modifications as come within the scope of the appended claims.

Having thus described the invention, what we claim as new and desire to protect by Letters Patent is:

1. A prefabricated jacket assembly for thermally and acoustically insulating a fluid conduit comprising:
   (a) a pair of mating semicircular longitudinal sections,
   (b) an outer metallic cover for each section,
   (c) means for connecting the longitudinal edges of said cover of each section together to form a cylindrical jacket,
   (d) insulation conforming to the configuration of said cover positioned upon the inner surface thereof,
   (e) a backing element for the exposed surface of said insulation,
   (f) yieldable spacing means positioned between the outer surface of the conduit to be insulated and said backing element of said insulation,
   (g) a vibration damper in the assembly between the outer cover and the conduit,
   (h) a damper supporting means comprising a pair of spaced apart support members each having a portion insertable through the center of said damper from opposite ends thereof so as to be independent of each other while cooperating to maintain said damper in its relation to said backing member, and
   (i) means for connecting said damper in facial contact with the inner surface of the cover with said connecting means isolated by said damper from said supporting leg portions.

2. A prefabricated jacket assembly as defined by claim 1, wherein said means for connecting said damper to said cover comprises a band like clamp embracing a portion of the exterior surface of said damper and being fixedly connected to the confronting surface of said cover while mounting facial contact between said cover and said damper.

3. A prefabricated jacket assembly as defined by claim 1, wherein said vibration damper is constructed from a form retaining, resilient, vibration absorbing material, such as rubber and the like.

4. A prefabricated jacket assembly as defined by claim 1, wherein said vibration damper is constructed from a form retaining, resilient, vibration absorbing material, such as rubber and the like.

* * * * *